United States Patent
Takahashi

(10) Patent No.: US 6,377,794 B2
(45) Date of Patent: *Apr. 23, 2002

(54) COMMUNICATION APPARATUS NOTIFYING CALLING INFORMATION TO CALLED PARTY

(75) Inventor: Shiro Takahashi, Higashihiroshima (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,753

(22) Filed: Apr. 27, 1998

(30) Foreign Application Priority Data

Aug. 29, 1997 (JP) ................................. 9-233629

(51) Int. Cl.⁷ .................. H04M 11/10; H04M 3/42; H04M 1/64; H04M 15/06; H04Q 7/20
(52) U.S. Cl. .................. 455/415; 455/412; 455/414; 455/460; 455/551; 455/564; 455/565; 379/88.2; 379/88.11; 379/88.12; 379/88.19; 379/88.21; 379/88.28; 379/142
(58) Field of Search .................. 455/412–414, 455/418, 550, 551, 564, 415, 460, 565, 575; 379/67.1, 88.01–88.28, 142, 216, 355, 356

(56) References Cited

U.S. PATENT DOCUMENTS

| | | | |
|---|---|---|---|
| 5,033,076 A | 7/1991 | Jones et al. | 379/67 |
| 5,675,630 A | * 10/1997 | Beatty | 379/59 |
| 5,937,052 A | * 8/1999 | Cook-Heilberg | 379/219 |
| 6,035,193 A | * 3/2000 | Buhrmann et al. | 455/426 |

FOREIGN PATENT DOCUMENTS

| | | | |
|---|---|---|---|
| DE | 38 15 908 | 11/1989 | |
| EP | 0 843 489 | 5/1998 | H04Q/3/72 |
| JP | 08331233 | * 12/1996 | H04M/1/57 |
| JP | 9-284382 | 10/1997 | H04M/1/57 |

OTHER PUBLICATIONS

Pendleton, "The Telco That Knew Too Much", *Telephone Engineer & Management*, vol. 94, No. 1, Mar. 1990, pp. 40–43.

* cited by examiner

Primary Examiner—Daniel Hunter
Assistant Examiner—Meless Zewdu
(74) Attorney, Agent, or Firm—Nixon & Vanderhye P.C.

(57) ABSTRACT

A communication apparatus includes an antenna, a TDMA/TDD processing unit, a radio unit provided between the antenna and the TDMA/TDD processing unit for data transfer, a telephone directory memory that stores a plurality of telephone numbers divided into a plurality of groups, and a control unit that determines which group in the telephone directory memory an input telephone number belongs to and provides control of whether to notify calling information to a called party via the TDMA/TDD processing unit, the radio unit and the antenna according to the determination result.

8 Claims, 4 Drawing Sheets

COMMUNICATION APPARATUS NOTIFYING CALLING INFORMATION TO CALLED PARTY

BACKGROUND OF THE INVENTION

1. Field of the Invention

The present invention relates to a communication apparatus such as a PHS (Personal Handy-phone System) terminal, a PDC (Personal Digital Cellular Communication System) terminal, a general telephone set, and the like.

2. Description of the Background Art

There are communication apparatuses such as a PHS terminal, a PDC terminal, and a general telephone set that have the function to notify information of the calling party such as the caller's telephone number and to provide a display of the information from the calling party at the called party at the time of a call incoming. There are also some communication apparatuses that have a call back function that utilizes stored information from a calling party for transmission and a select call function for altering the audio of the ring back tone when there is a call from a predetermined calling party according to the information from the calling party.

Usability has been improved significantly at the called party by the above apparatuses since the called party can confirm the calling party before responding to the call. However, there is a possibility that information of the calling party such as the telephone number will be known to an inappropriate third party in the event that an erroneous calling operation is made at the caller side.

To obviate the above problem, an apparatus is proposed that allows the user to designate whether to supply calling information or not. Japanese Patent Laying-Open No. 8-331233 discloses an apparatus that is provided with a flag that can be set at the time of registering a telephone number into the telephone directory to designate whether to notify the calling information or not. In the former apparatus, the setting once made becomes valid for all subsequent calls. For example, once this function is set as "off", notification of the calling information is suppressed for all subsequent calls. Therefore, the possibility of the calling information being sent to an improper third party due to erroneous calling operation is eliminated. However, there is a disadvantage that in the event of a proper calling operation to an intended called party, the information of the calling party could not be informed, so that the call back function and select call function, if equipped in the communication apparatus of the called party, cannot be used. The latter apparatus has the advantage of sending the calling information only to the intended called party since determination is made at the time of the call originating to notify or not the calling information by means of the flag that is registered in association with the telephone number. However, this apparatus is disadvantageous in that a complex operation is required by the user since the flag has to be registered in addition to registration of a telephone number. Furthermore, a memory having a large capacity is required since the data region for flag registration must be provided for each telephone number. There was a problem that the cost and size of the apparatus are increased.

SUMMARY OF THE INVENTION

An object of the present invention is to provide a communication apparatus that can notify calling information to only a desired party without tedious operation of telephone number input by the user, and without increase in cost and size.

According to an aspect of the present invention, a communication apparatus includes an antenna, a TDMA (Time Division Multiple Access)/TDD (Time Division Duplex) processing unit, a radio unit provided between the antenna and the TDMA/TDD processing unit for data transfer, a telephone directory memory storing a plurality of telephone numbers classified into a plurality of groups, and a control unit that identifies which group in the telephone directory memory the input telephone number belongs to to provided control of whether to notify calling information or not to a called party via the TDMA/TDD processing unit, the radio unit, and the antenna according to the determination result.

Since the control unit determines which group the input telephone number belongs to in the telephone directory memory and provides control of whether to notify the calling information to the called party according to the determination result, the calling information can be provided at the time of the call originating to only a predetermined party. Therefore, the complicated operation required of the user can be reduced. Also, the memory for storing a flag is no longer required. It is therefore possible to suppress increase in the cost in accordance with additional functions and increase in the size of the communication apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

A communication apparatus according to an embodiment of the present invention will be described hereinafter with reference to the drawings.

Figure 1:
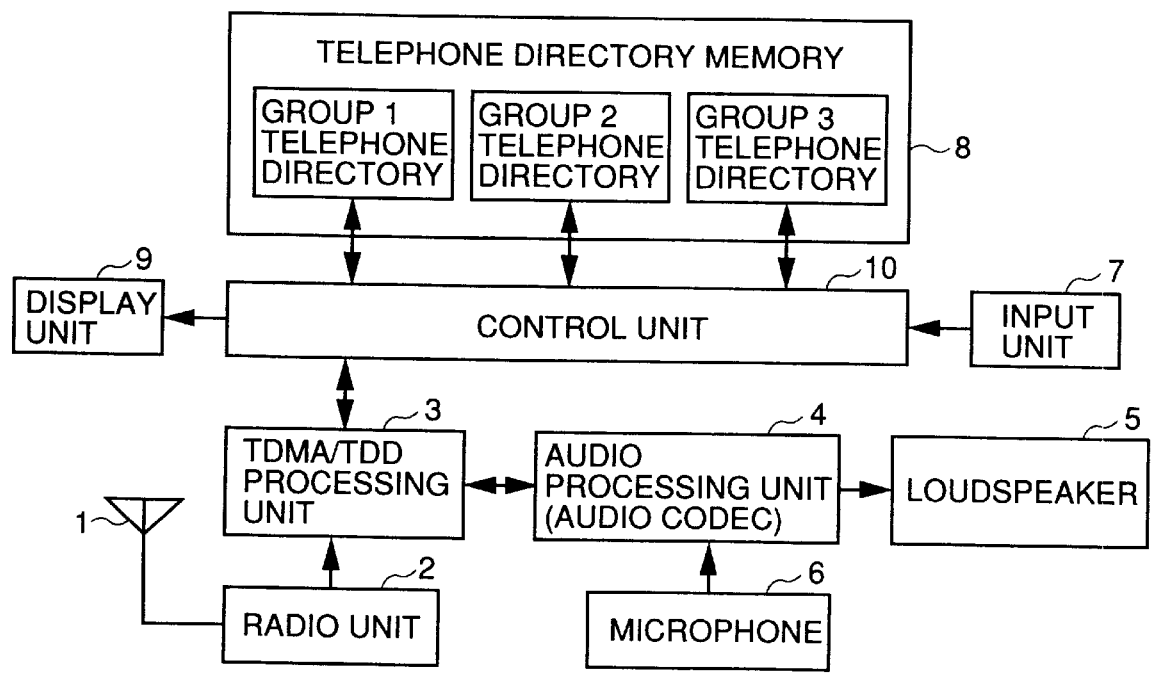
FIG. 1 is a block diagram schematically showing the electrical structure of a communication apparatus according to an embodiment of the present invention.

Referring to FIG. 1, a communication apparatus includes an antenna 1, a radio unit 2 for transmitting to or receiving from a base station not shown data via antenna 1, a TDMA/TDD processing unit 3 for assigning a communication channel to a time slot in a radio line and for deassemble/assemble of a radio frame having a control channel and a communication channel, an audio processing unit 4 for converting an analog audio signal into a digital signal and a digital audio signal into an analog signal to compress and expand a digital signal, a loudspeaker 5 for providing the analog signal converted by audio processing unit 4 as audio outside, a microphone 6 for collecting external audio and supplying the same as an analog signal to audio processing unit 4, an input unit 7 for entry of a telephone number and entry of activate/deactivate designation of various functions, a telephone directory memory 8 for storing a telephone number entered by input unit 7, a display unit 9 for providing display of a telephone number input through input unit 7 or read out from telephone directory memory 8 or according to a calling number sent from a base station not shown, and a control unit 10 for providing control of each component.

Telephone directory memory 8 substantially includes three registration groups as shown in FIG. 1. Registration of a telephone number into a relevant group is effected by designating telephone number registration together with entry of the telephone number through input unit 7. Control unit 10 provides a display of a registration group select screen on display unit 9. The user specifies a group through input unit 7 while referring to display unit 9. The input telephone number is stored in the designated group. Control unit 10 includes a flag indicating whether a calling number is to be notified or not and a flag indicating the set state of a calling number notification for each group.

Figure 2:
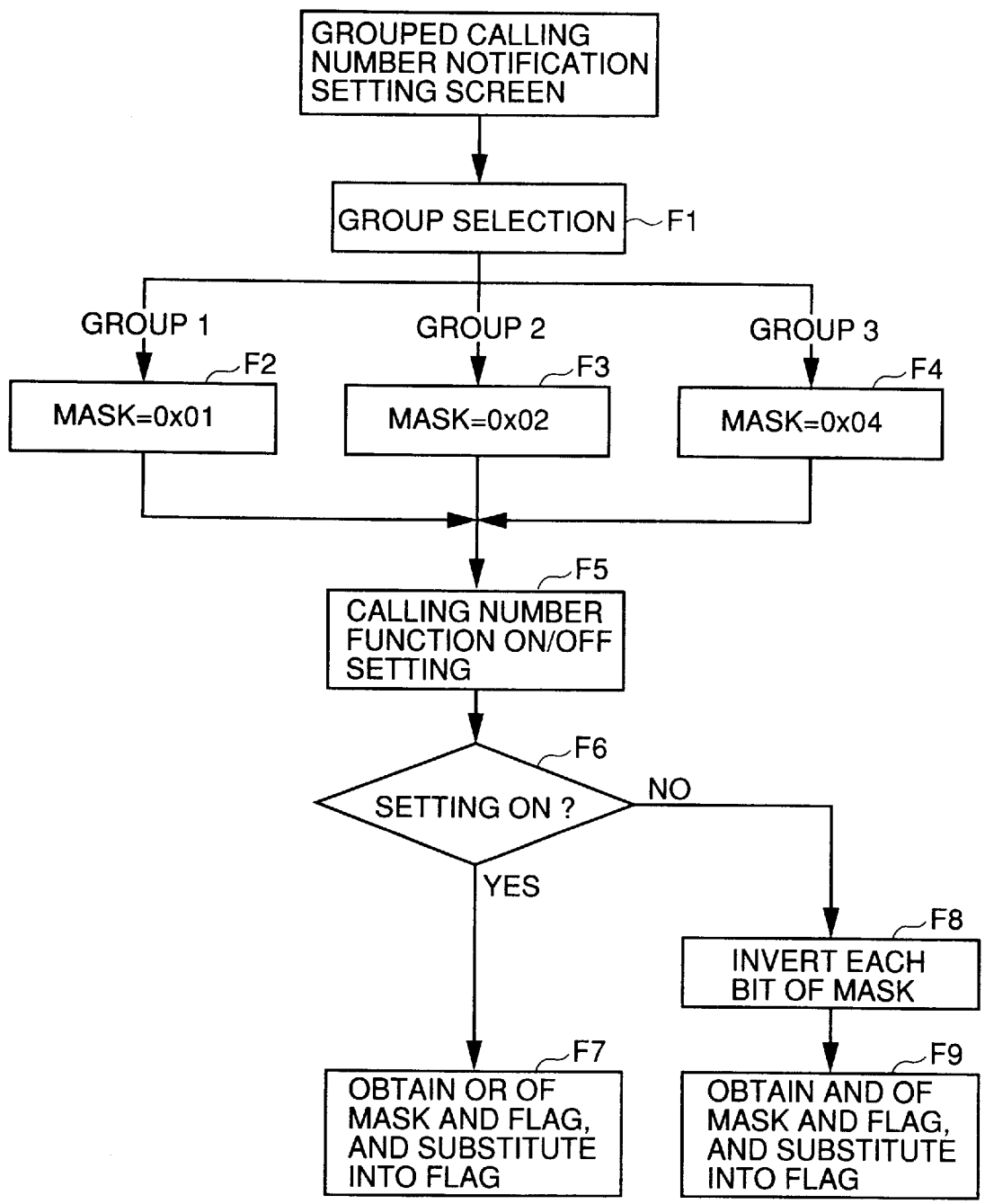
FIG. 2 is a flow chart for describing the operation of calling information notification setting in the communication apparatus of the present invention.

The operation of setting a group that provides calling number notification in the communication apparatus of the above structure will be described hereinafter with reference to the flow chart of FIG. 2.

When calling number notification group setting is designated by input unit 7, control unit 10 provides a display of the telephone number notification setting screen for each group on display unit 9. At this stage, the user selects a desired group through input unit 7 (step F1). Control unit 10 sets the bit corresponding to the group selected by input unit 7 into the auxiliary flag MASK (steps F2, F3 and F4).

Then, designation of whether or not to notify a calling number is set by input unit 7 (step F5). When control unit 10 determines that the designation corresponds to a notify designation (step F6: YES), control unit 10 obtains the OR of the auxiliary flag MASK and the grouped calling number display set flag "Flag", and sets the relevant bit of "Flag" to 1 (step F7). When control unit 10 determines that the designation corresponds to an inhibited notification (step F6: NO), control unit 10 obtains the AND of the inverted version of each bit of auxiliary flag MASK (step F8) and the grouped calling number display set flag "Flag", and sets the relevant bit of "Flag" to 0 (step F9).

According to the above-described control, the user can set an arbitrary group in which a telephone number is registered as a group that allows calling number notification or a group that suppresses notification of the calling number.

Figure 3:
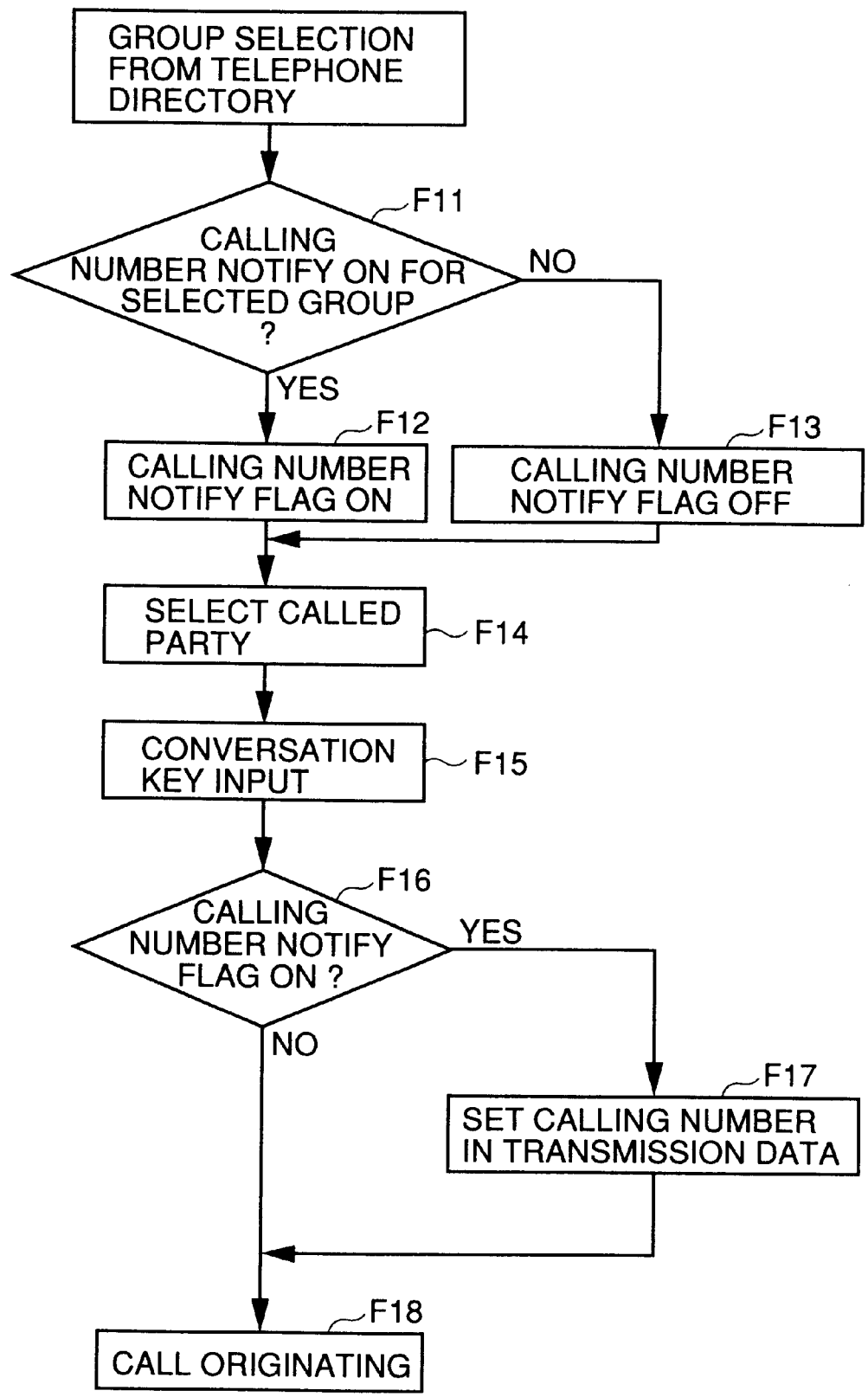
FIG. 3 is a flow chart for describing the operation in the event of a call originating by the communication apparatus of the present invention.
Figure 4A:
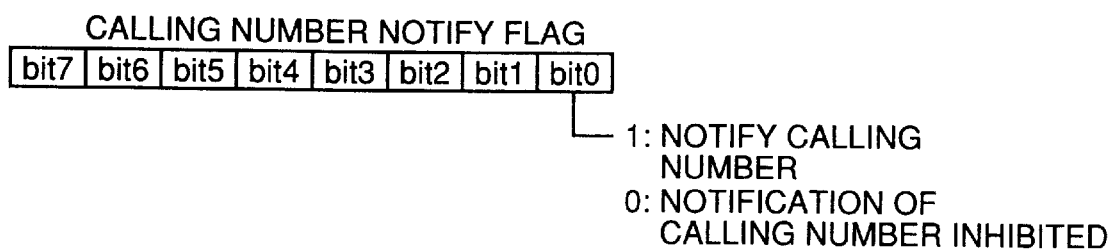
FIG. 4A shows a flag indicating whether or not to notify a calling number.
Figure 4B:
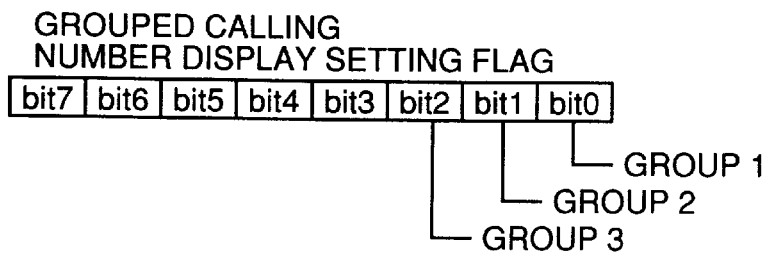
FIG. 4B shows a flag representing the set state of the calling number notification for each group.

The calling operation will be described hereinafter with reference to the flow chart of FIG. 3.

Upon designation of displaying the telephone directory by the user through input unit 7, control unit 10 provides display of a group select screen on display unit 9. When a group is selected through input unit 7 at this stage, control unit 10 determines whether the selected group corresponds to the group that allows calling number notification by referring to the grouped calling number display set flag (step F11). When determination is made that the group corresponds to a calling number notify group (F11: YES), the calling number notify flag is set to 1 (step F12). When NO at step F11, the calling number notify flag is set to 0 (step F13).

The telephone number registered in the selected group is sequentially displayed on display unit 9 by designation through input unit 7 (step F14). When a call is designated through input unit 7 at the time point where the required destination party is provided on the display (step F15), control unit 10 identifies the calling number notify flag (step F16). When the flag is 1 (step F16: YES), the calling number is set to the transmission data (step F17), and despatched (step F18). When the flag is 0 (step F16: NO), a call is issued without setting the calling number in the transmission data (step F18).

According to the above control, a calling number can be notified to only the party of a desired telephone number without having to register a flag for each telephone number. Therefore, the data capacity of the memory can be suppressed. Also, the usability can be improved since a telephone number is classified and registered into a predetermined group.

The control is not limited to the above-described case where a call is effected using the telephone directory. For example, a telephone number entered through input unit 7 can be compared with the telephone number stored in telephone directory memory 8 to identify the group in which the matching telephone number is registered. Determination is made whether that group is a group corresponding to a calling number notify group, whereby a call is effected according to the determined result. By effecting a call without notifying the calling number when a telephone number that matches the input telephone numbers is not stored in telephone directory memory 8, the possibility of the calling number being erroneously notified due to erroneous input of a telephone number can be prevented.

According to the communication apparatus of the present invention, determination of whether or not to notify calling information to a called party is made automatically according to the group in which the telephone number is registered. A call is despatched according to the determined result. Since the calling information can be notified only at the time of a call to a predetermined party, no complicated operation for setting a flag is required. The complicated operation that had to be carried out by the user is reduced. Also, the memory for the flag is dispensable. Increase in the cost due to additional new features and increase in the size of the apparatus can be prevented.

Since the group that allows notification of calling information to a called party can be selected arbitrarily at the user side, the number of called parties intended of notification of the calling information can be set arbitrarily even when the number of parties that can be registered in a group is predetermined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable communication apparatus comprising:
   a telephone directory storage device for storing a plurality of telephone numbers divided into a plurality of groups, wherein each group includes a plurality of telephone numbers; and
   a controller for determining, prior to a call being initiated, which group of said plurality of groups an input telephone number for the call belongs to in said storage device, and for deciding, prior to originating the call, whether a calling party telephone number is to be notified to a called party based on the determination result, wherein each group includes an indicator that is used by said controller to control whether to notify the calling party telephone number for all telephone numbers included in each group, respectively.

2. The communication apparatus according to claim 1, wherein said communication apparatus originates a call without notifying the calling information to the called party when said controller determines that the input telephone number does not exist in any group in said storage device.

3. The communication apparatus according to claim 1, further comprising:

a display for displaying a predetermined telephone number from the plurality of groups stored in said storage device; and a selector for selecting a telephone number from said telephone number displayed on said display;

wherein said controller determines which group the telephone number selected by said selector belongs to in said storage device and decides whether to notify the calling information to the called party according to a determination result prior to originating the call.

4. The communication apparatus according to claim 3, wherein said display provides display of a telephone number for each group out of the plurality of groups stored in said storage.

5. A portable communication apparatus comprising:

an antenna;

a TDMA/TDD processing unit;

a radio unit provided between said antenna and said TDMA/TDD processing unit for data transfer;

a telephone directory memory that stores a plurality of telephone numbers divided into a plurality of groups, wherein each group includes a plurality of telephone numbers; and a control unit that determines, prior to a call being initiated, which group in said telephone directory memory an input telephone number for the call belongs to and provides control of whether to notify calling information to the called party via said TDMA/TDD processing unit, said radio unit and said antenna according to the determination result, wherein each group includes an indicator that is used by the control unit to control whether to notify calling party telephone number for all telephone numbers included in each group, respectively.

6. The communication apparatus according to claim 5, wherein said control unit originates a call without notifying the calling information to the called party when said input telephone number does not belong to any group in said telephone directory memory.

7. The communication apparatus according to claim 5, further comprising a display unit that provides a display of a predetermined telephone number from the plurality of groups stored in said telephone directory memory; and an input unit that selects a telephone number from the telephone number displayed on said display unit;

wherein said control unit determines,which group the telephone number selected by said input unit belongs to in said telephone directory memory and provides control of whether to notify the calling information to the called party via said TDMA/TDD processing unit, said radio unit and said antenna according to the determination result.

8. The communication apparatus according to claim 7, wherein said display unit provides display of a telephone number for each group out from the plurality of groups stored in said telephone directory memory.

* * * * *